United States Patent [19]

Pascouet

[11] Patent Number: 5,128,907
[45] Date of Patent: Jul. 7, 1992

[54] MARINE ACOUSTIC SOURCE

[76] Inventor: Adrien P. Pascouet, 8925 Lipan, Houston, Tex. 77063

[21] Appl. No.: 682,633

[22] Filed: Apr. 9, 1991

Related U.S. Application Data

[62] Division of Ser. No. 300,590, Jan. 23, 1989, Pat. No. 5,018,115.

[51] Int. Cl.⁵ .............................................. G01V 1/04
[52] U.S. Cl. .................................... 367/144; 181/120
[58] Field of Search ................ 367/144, 146; 181/115, 181/118, 119, 120

[56] References Cited

U.S. PATENT DOCUMENTS

| | | | |
|---|---|---|---|
| 4,219,098 | 8/1980 | Thomson et al. | 181/120 |
| 4,225,009 | 9/1980 | Hamson et al. | 181/120 |
| 4,594,697 | 6/1986 | Pascouet | 367/146 |
| 4,921,068 | 5/1990 | Pascouet | 181/115 |
| 5,018,115 | 5/1991 | Pascouet | 367/144 |

Primary Examiner—Brian S. Steinberger
Attorney, Agent, or Firm—Arnold, White & Durkee

[57] ABSTRACT

A compact, marine acoustical source is disclosed. More specifically, the present invention relates to a marine acoustical source capable of producing a strong primary pulse while substantially suppressing or eliminating undesired secondary pulses derivative from said primary pulse.

9 Claims, 15 Drawing Sheets

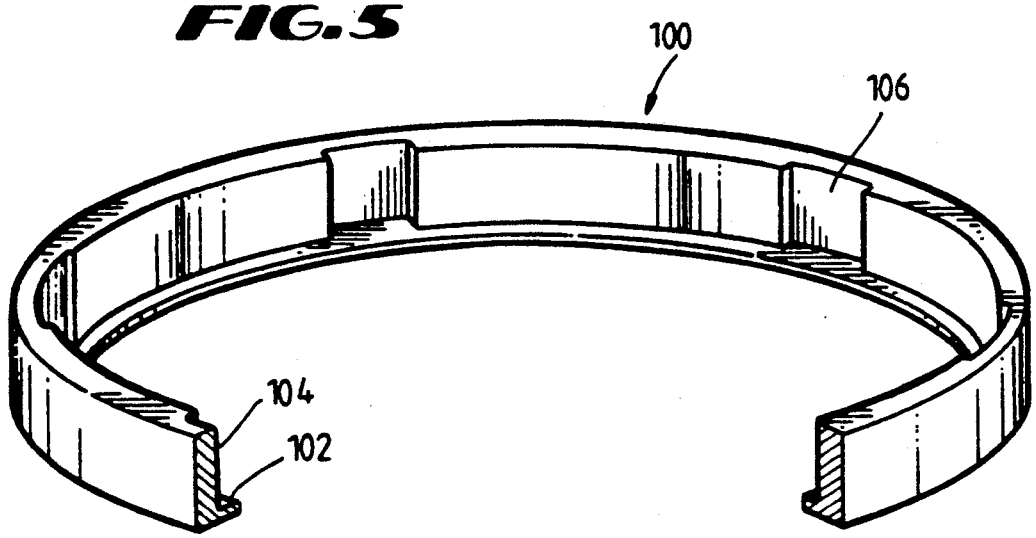
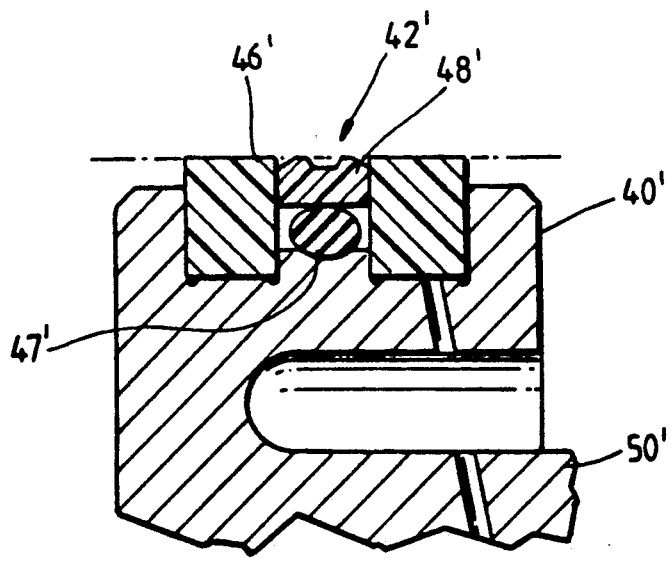

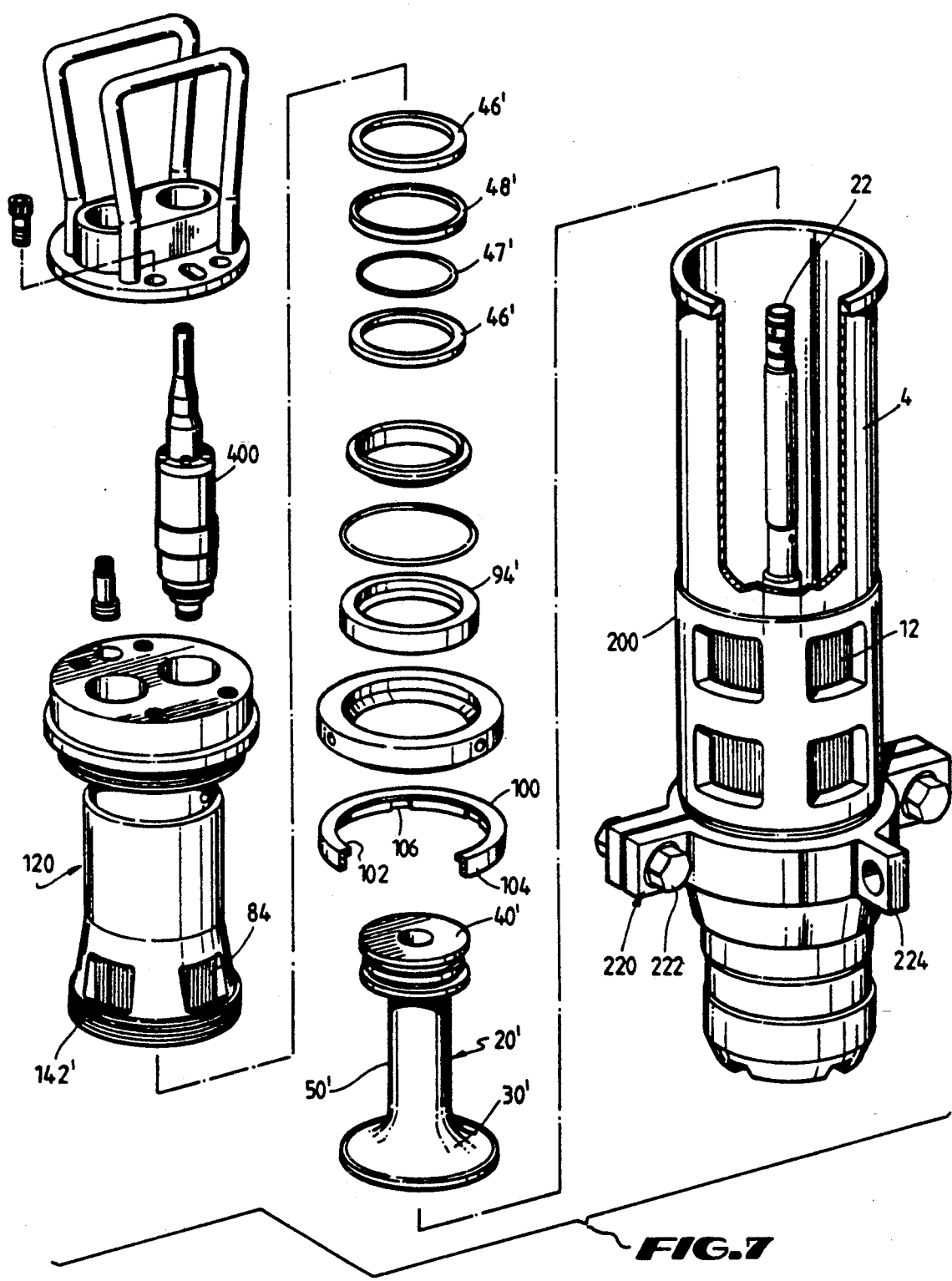

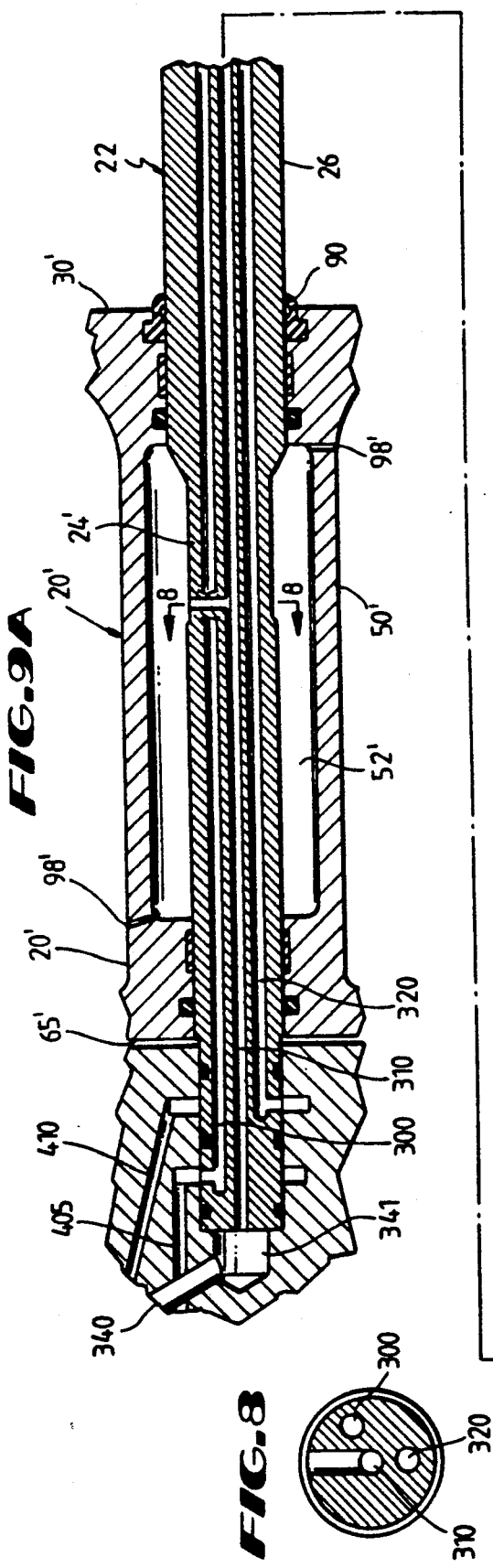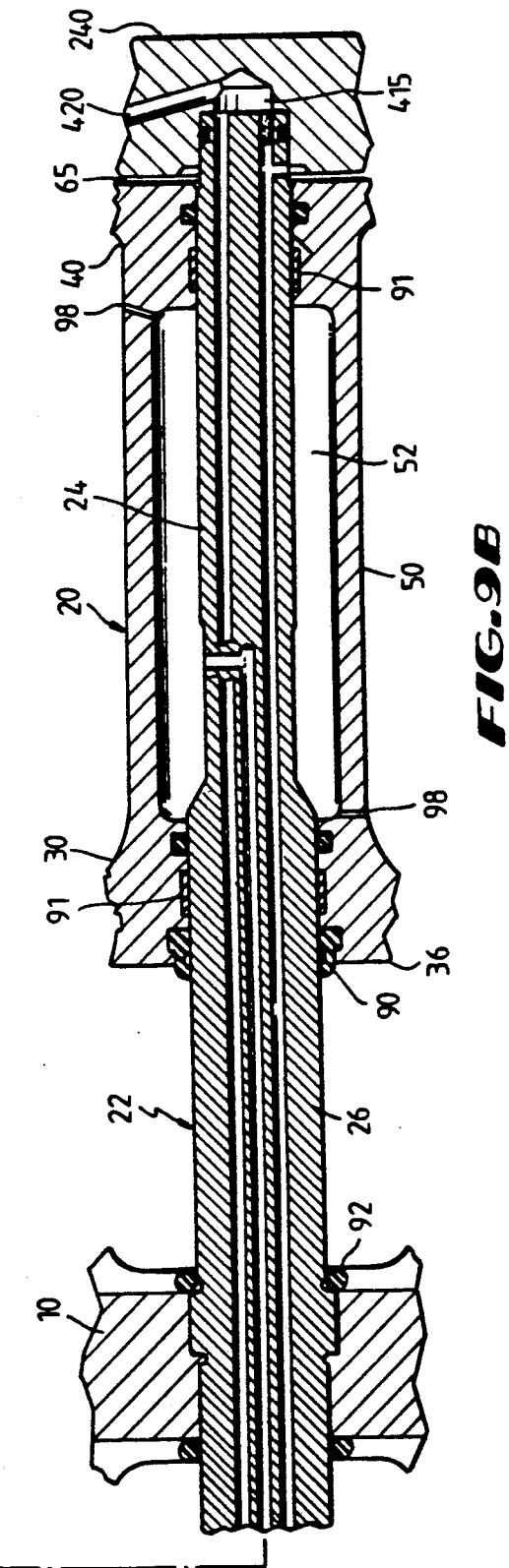

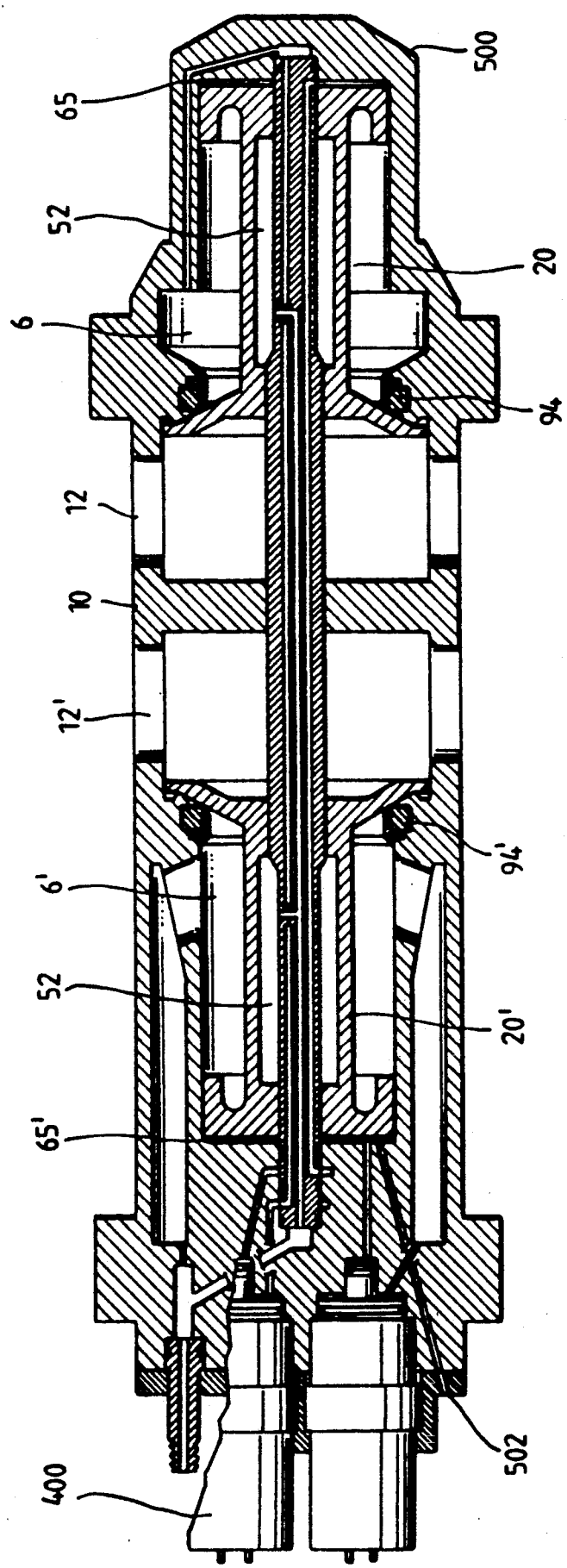
FIG. 10A (PHASE 1)

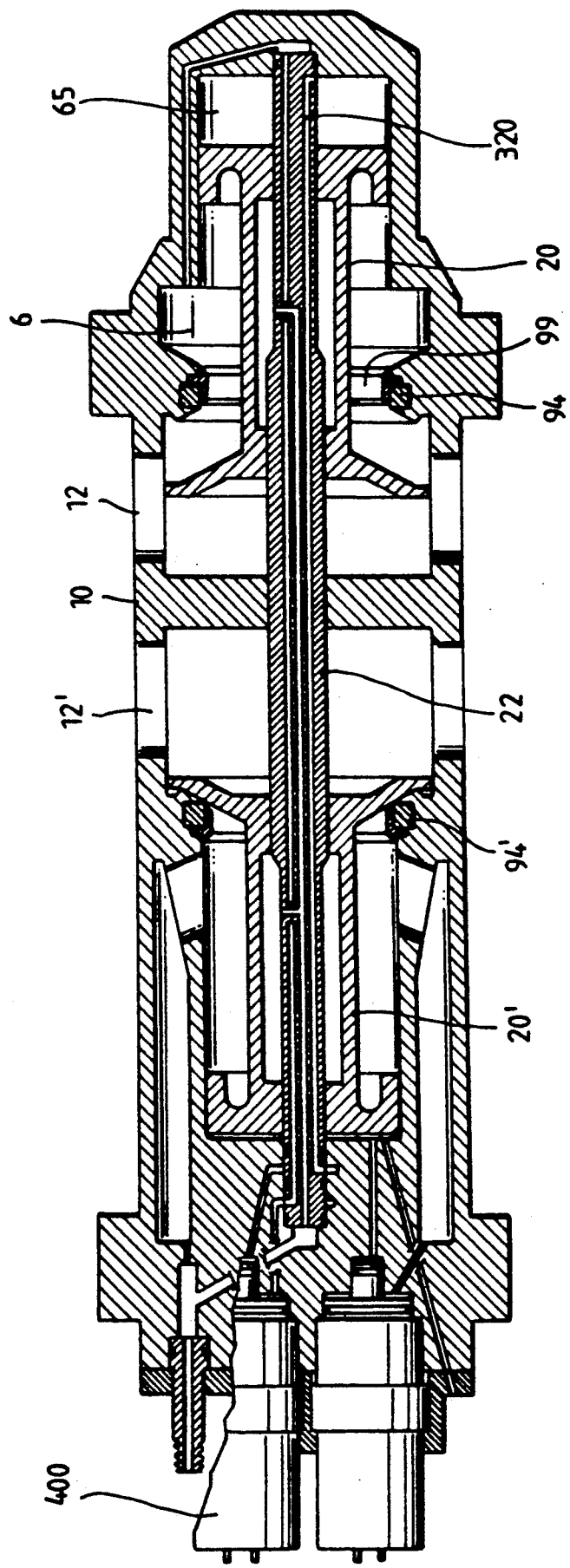
FIG. 10B (PHASE 2)

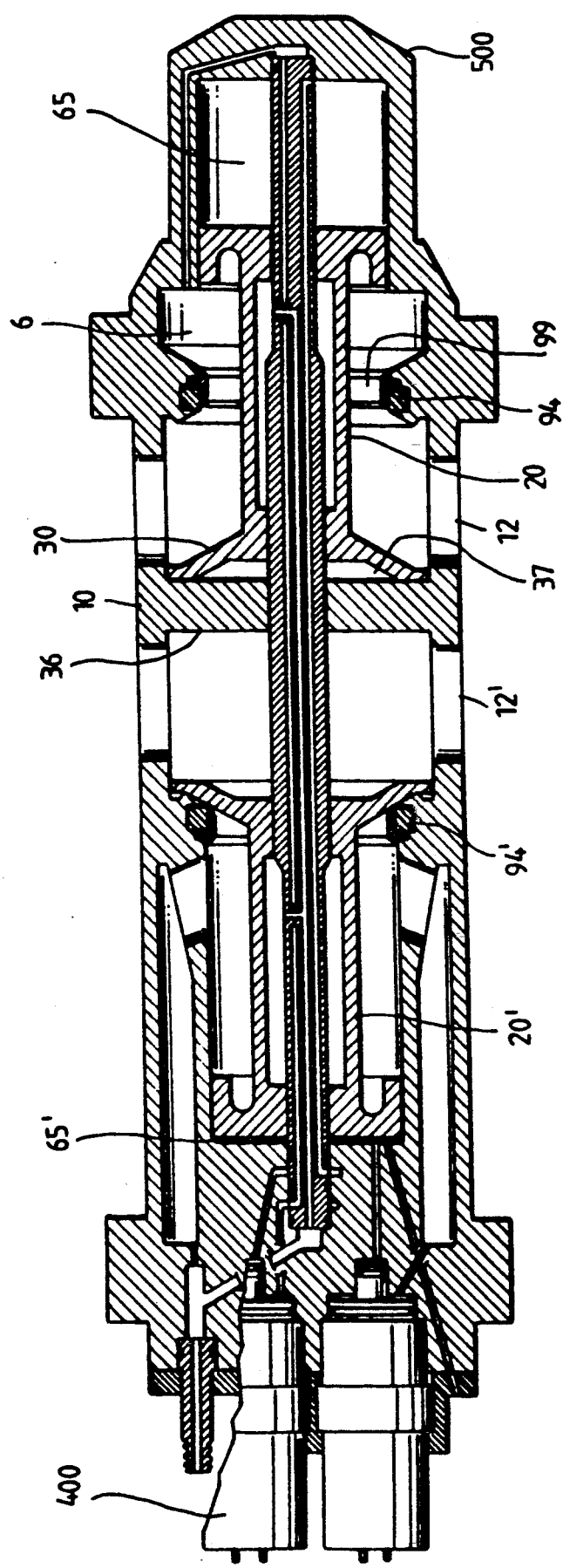
FIG.10C (PHASE 3)

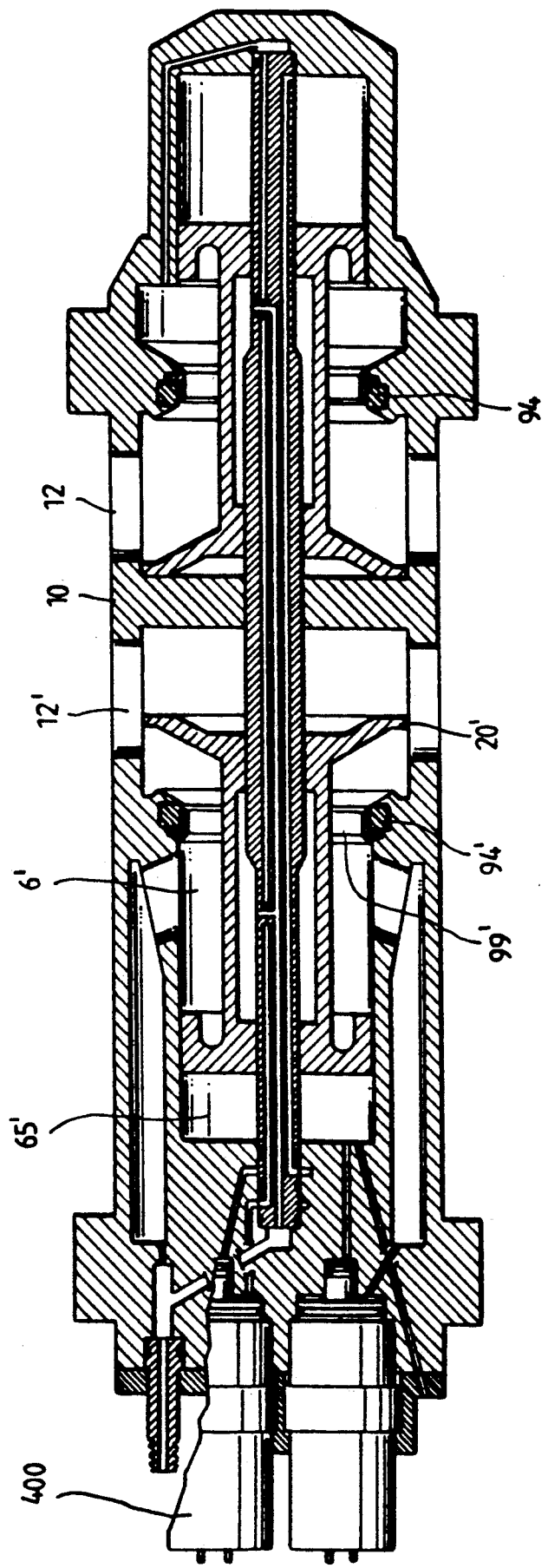
FIG.10II (PHASE 4)

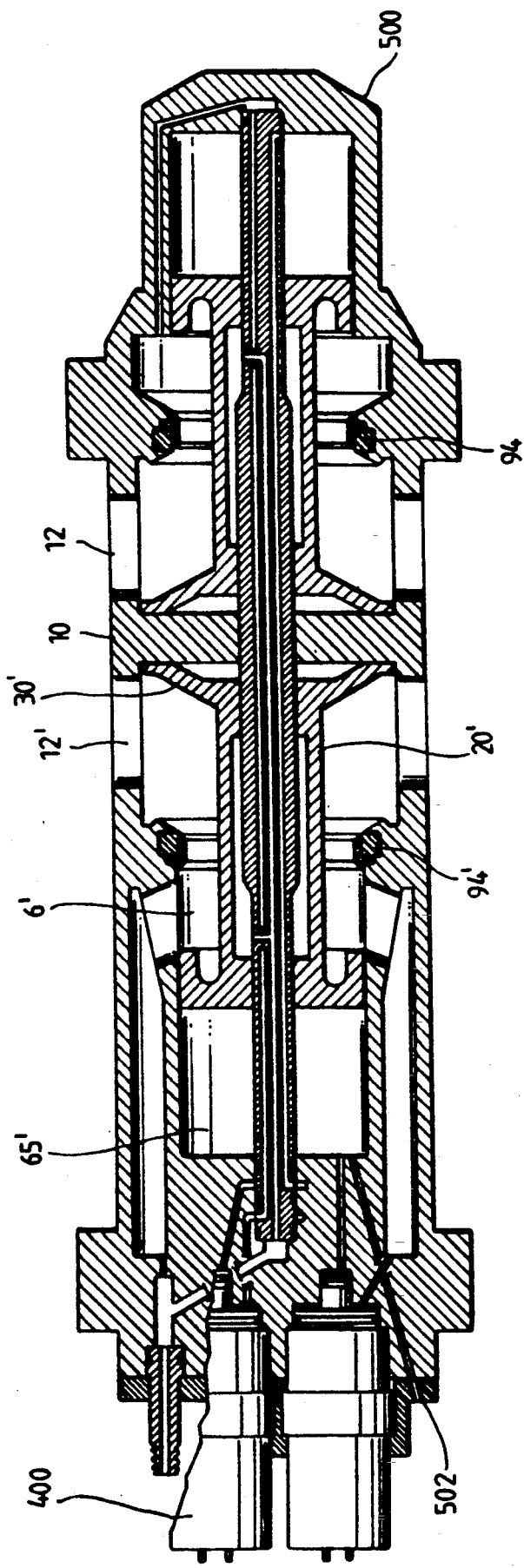
FIG. 10E (PHASE 5)

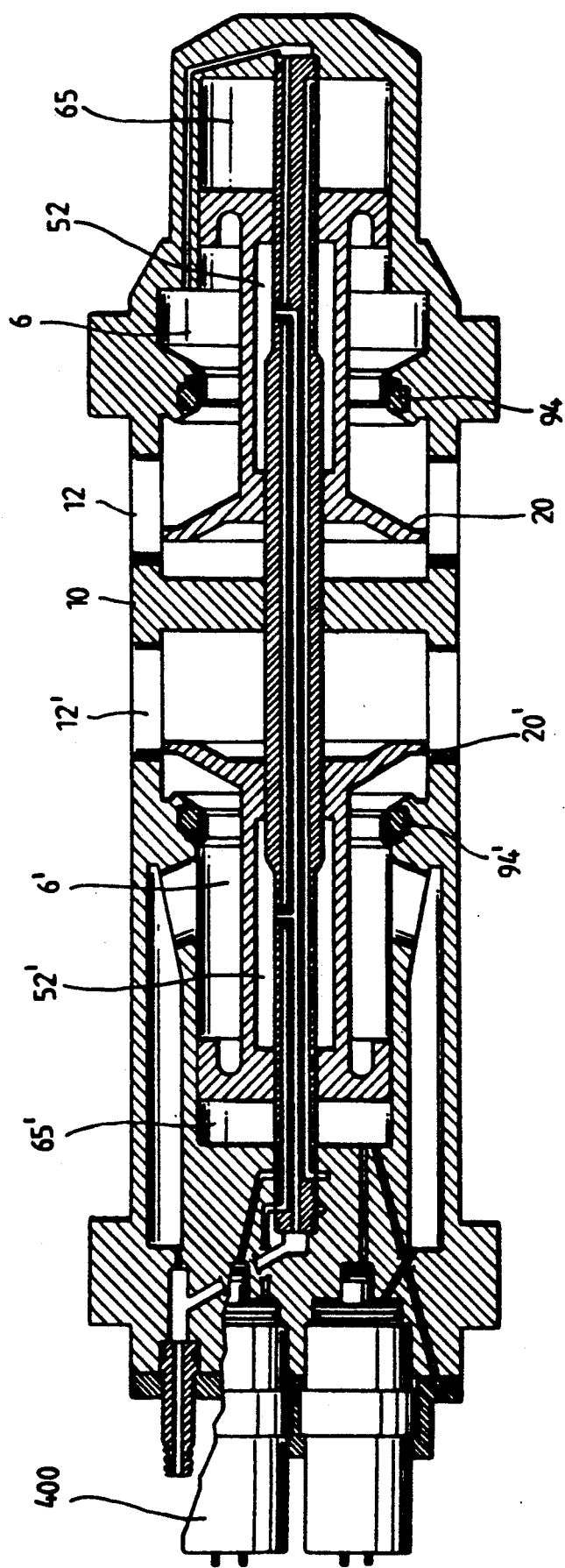
FIG.10F (PHASE 6)

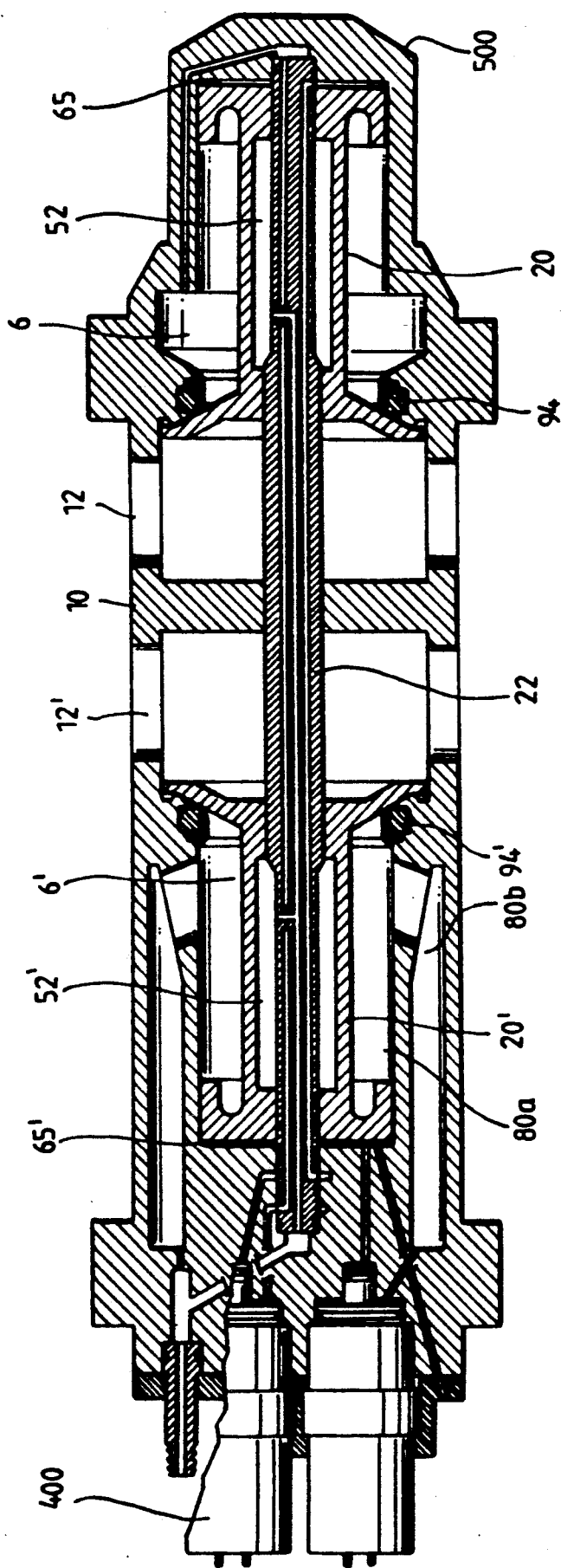
FIG.10G (PHASE 7)

MARINE ACOUSTIC SOURCE

This is a divisional application of co-pending U.S. application Ser. No. 300,590 filed on Jan. 23, 1989. Now U.S. Pat. No. 5,018,115.

BACKGROUND OF THE INVENTION

1. Field of the Invention

The present invention generally relates to an acoustic source useful in marine seismic exploration. More specifically, the present invention relates to a compact, marine acoustical source capable of producing a strong primary pulse while substantially suppressing or eliminating undesired secondary pulses derivative from said primary pulse.

2. Description of the Prior Art

In marine seismic exploration, it is often desirable to generate in a body of water overlying a geological formation, a series of strong acoustical pulses or waves. These pulses rapidly pass through the water and the formation and are reflected at the surface for eventual interpretation. Methods of marine seismic exploration using such acoustical pulses have long constituted a major tool for marine oil and gas exploration.

To achieve such pulses, certain seismic sources such as explosives, air guns, gas exploders, etc., are purposely fired deep under water. It is well known that such firing creates a gas bubble or cavity and that the water acquires oscillatory energy which generates acoustic pressure wavelets, each consisting of a desired "primary" acoustic pressure pulse having an amplitude which is especially useful for most seismic exploration work, and which is followed by an oscillating succession of undesired "secondary" (sometimes called "bubble") acoustic pulses of decreasing amplitude. In this context, the words "bubble" and "cavity" will be used interchangeably.

A variety of apparatus and techniques have been developed in the art to overcome the development of such secondary pulses. For example, one early mechanical technique attempted to prevent these secondary pulses from traveling vertically downward by substantially surrounding the source with a container or cage having perforations so that the extending gas bubble would have to do work in order to force water through the perforations. According to such theory, the work done by the expanding gas bubble dissipated its internal energy so that the ensuing secondary pulse would have reduced amplitudes. This technique was employed in a seismic source trademarked FLEXOTIR. A serious limitation inherent in this technique was that the desirable primary pulses likewise became reduced in strength since they too could travel only through the available perforations. Also, the perforated cage used in such technique became subject to rapid deterioration due to the great stress to which it was subjected during operation.

Other prior art techniques have utilized the injection of air into the expanding bubble for the purpose of shaping the secondary pulses. An overview of such techniques and their associated limitations and disadvantages are described in U.S. Pat. No. 4,735,281 and U.S. Pat. No. 4,921,068 which are herein incorporated by reference.

It may generally be stated, however, that prior art apparatus designed to emit a satisfactory primary pulse have failed to incorporate the structures necessary to implement state of the art techniques directed toward the suppression of undesired secondary pulses. Further, prior art apparatus directed toward attempted solutions of the problem of bubble suppression have generally been inefficient, heavy, and cumbersome. This combination has made their use, on board retrieval and repair, difficult.

Additionally, the operation of such apparatus has generally been comparatively dangerous as caused by the need to pressurize the devices on board the seismic vessel before immersing. Such on board pressurization has been needed to prevent fouling by the entrance of seawater into the units prior to firing.

SUMMARY OF THE INVENTION

The present invention addresses the above noted and other disadvantages of prior art marine acoustic devices by providing an acoustical source which is designed to implement state of the art techniques for internal bubble suppression. Thus, the present invention may be used in accordance with techniques described, for example, in U.S. Pat. No. 4,735,281, and U.S. Pat. No. 4,921,068. When employing these techniques, the generation of a strong primary pulse is realized, while substantially reducing or eliminating the presence of secondary pulses.

Structurally, the present invention generally includes a cylindrical housing defining in its interior two chambers longitudinally opposed about a partition or barrier. These reservoir chambers are open to the water via main ports. Preferably, these ports are situated closely proximate the partition. As so situated, the ports of one chamber are closely adjacent the ports of the other chamber. Both chambers are designed to contain charges of pressurized gas.

Partially disposed in each of these chambers is a shuttle slidably coupled to a shaft which itself is longitudinally situated through the housing about its main axis. Movement of each shuttle is regulated by pressurized gas which is provided through several apertures or passageways longitudinally disposed in the shaft. This pressurized gas is supplied from compressors or other suitable gas sources located on the surface, e.g., on a seismic vessel. Release or activation of the gas is preferably controlled by a solenoid or similar trigger device disposed in the housing and operatively coupled to the chambers. Operation of the solenoid or triggers is electronically regulated and mentioned onboard the seismic vessel.

Each shuttle is mounted on and slides relative to an axially disposed shaft. Preferably, the shaft is a single integral shaft which extends through both chambers and the partition between the chambers. Preferably, the shaft is equipped with longitudinal passageways for the flow of gas from outside sources into the chambers.

The individual shuttles preferably comprise a hollow cylindrical member terminating at one end in an enlarged piston and at its other end in an even larger diameter valve member. The axially inner surface of the valve member tapers outwardly to a small cylindrical rim or piston. A valve surface is located between the rim and the central axis of the valve member. The piston end of each shuttle is adapted to slide in a fluid-tight relation within its respective reservoir chamber. The rim of the valve member is also adapted to slide outside of its reservoir chamber but not in a fluid-tight relation.

To supply air or other gas to each of the two chambers, passageways are preferably provided directly in the shaft on which the shuttles slide. Each such passageway extends from outside the gun to a selected destination within the gun. Thus, one passageway may extend gas to intervals of the shuttle and the two chambers. Another passageway may carry gas to trigger movement of the generator shuttle, and still another passageway to similarly trigger the suppressor shuttle.

In operation, each shuttle reciprocates between a seated or "cocked" position and an unseated or "uncocked" position as determined by the management and distribution of compressed gas throughout the chambered system. When a shuttle is in a "cocked" or seated position, gas is contained and pressurized in the reservoir chamber associated with the valve. When activated, the shuttle moves quickly to an "uncocked" or unseated position, thereby releasing the pressurized gas from the chamber into the water through the main port in the chamber.

The release of pressurized gas is preferably conducted in accordance with certain time, volume, pressure and proximity restrictions of operation as taught in U.S. Pat. No. 4,735,281 and U.S. Pat. No. 4,921,068. In accordance with such teachings, each chambered system fulfills a distinct purpose of bubble generation or injection. In this connection, actuation of the shuttle in a first chamber results in the release or generation of a pressurized gas charge into the water resulting in a strong primary acoustic pulse. The activation of the shuttle in the second chamber results in the injection of a second gas charge into the bubble created by the first charge so as to suppress undesired oscillation of this bubble. Hence, the first chambered system is referred to as a generator and the second chambered system is referred to as an injector or suppressor.

In operation, the unlocking or unseating of the first shuttle causes the generator to generate a rapidly expanding bubble having a strong primary pulse. The second shuttle, when unseated, causes the injector or suppressor to next activate and directly inject a second charge of compressed gas into the first bubble which has by now encompassed ports of the second chamber. Internal injection is thus accomplished, with a corresponding reduction or elimination of a secondary acoustic pulse dependent on the parameters of volume, time, pressure, etc., observed in the operation of the system as above discussed.

Once each chamber has been fired, its shuttle is returned to its cocked or seated position to accept a fresh charge of pressurized gas. Preferably, each shuttle is designed such that it is biased to return to its seated position when the gas pressure in its particular reservoir chamber has dropped sufficiently. Further, the biasing is preferably accomplished pneumatically by the application of gas pressure on internal areas within the shuttle. Thus, when a shuttle is in an open position, internal portions of the shuttle are exposed to gas pressure which provide for net axial force moving the valve back to its "closed" position. Although each chamber may be fired independently, the respective shuttle is automatically returned to a cocked state following such firing.

The present invention has a number of advantages over the prior art. One such advantage is the ability of the invention to employ state of the art methods of bubble suppression utilizing parameters of time, volume, pressure and proximity. In particular, a desirable strong primary pressure pulse may be generated without the generation of undesired secondary pulses.

A second advantage of the present invention is its relatively lightweight, compact size which enhances its utility and manageability in rough seas and under inclement weather conditions. In such a fashion, the device of the present invention may be retrieved, repaired and resituated in a firing attitude within the water with only nominal effort and a minimum of onboard hoisting equipment.

A third advantage of the present invention is its ability to be pressurized or activated after placement in the marine environment, hence reducing accidents caused by indvertent on-board discharge. Due to the design of the present device, such placement does not result in fouling of the device or a reduction of efficiency.

In particular, each shuttle and its chamber are vented internally such that any liquid trapped there may be readily purged within a very short period of time. In general, the overall gun is essentially capable of self-purging.

Yet another advantage of the invention involves its versatility and utility in a wide variety of seismic applications. Utilizing the present invention, it is possible to generate, in combination or singularly, a variety of acoustic pulses, suppressed or unsuppressed, as useful in marine geophysical exploration or other applications.

BRIEF DESCRIPTION OF THE DRAWINGS

FIG. 5 illustrates a perspective, cutaway view of the ring.

FIG. 9 illustrates a detailed, cross sectional view of the smaller piston and it associated piston seal.

FIG. 7 illustrates a detailed, exploded view of the component parts of one preferred embodiment of the invention.

FIG. 8 illustrates a detailed, cross sectional view of the guide shaft relative to the injector chamber.

FIG. 9 illustrates a detailed, cross sectional view of the guide shaft relative to the generator chamber.

FIG. 10A-G illustrates a cross sectional view of a preferred embodiment of the invention through various stages of operation.

DETAILED DESCRIPTION OF THE DRAWINGS

A. Theory of Optimum Design

Figure 1:
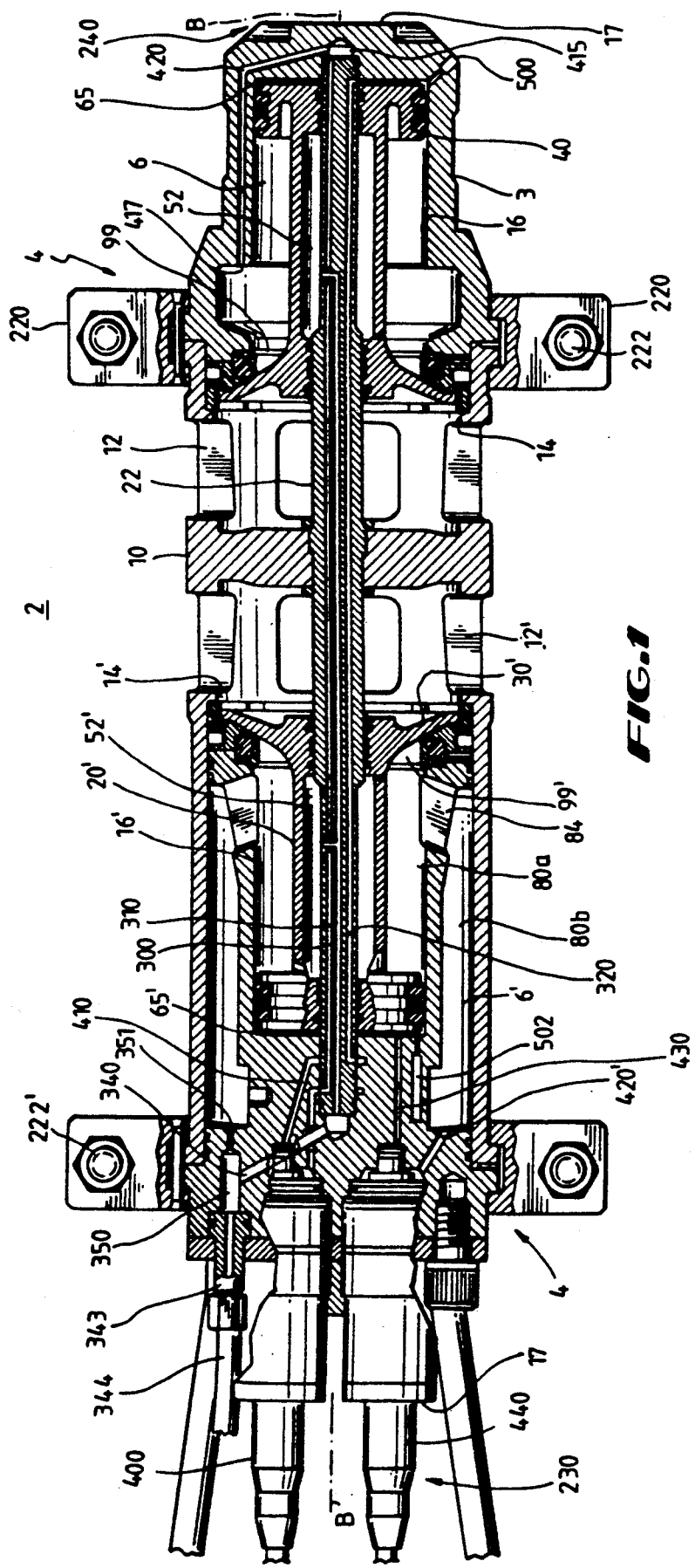
FIG. 1 illustrates a cross sectional view of one preferred embodiment of the invention as taken along major axis B—B.

The present invention generally relates to a marine acoustic source designed to be operated from and/or towed behind a marine vessel so as to enable seismic evaluation of subsurface geological formations. In such capacity, the acoustic source or "airgun" is often immersed in the water and in continuous operation for protracted periods, During such operation, the device emits a series of strong primary pulses, the reverberation and reflection of which is gathered on board the seismic vessel for evaluation of the geological formation.

The use of strong acoustical shock waves to analyze subsurface strata is well known in the art. On land, dynamite charges or other explosives such as nitroglycerine are often used to generate a strong acoustical wave or pulse. In marine applications, however, subsurface explosive discharges often produce a "bubble" or region of low pressure having a center at the point of the explosion. This bubble rapidly expands to a terminal diameter and then rapidly collapses. This collapse produces an undesired secondary pulse, the presence of which distorts the ultimate evaluation of the geological formation.

Using the interrelationship of time, pressure, and volume, a variety of methods have been developed to address the suppression of this secondary pulse. The foremost solution to this problem is addressed in U.S. Pat. No. 4,735,281 and U.S. Pat. No. 4,921,068, which describe the injection of a pressurized gas charge inside this first or primary bubble using specific parameters so as to achieve desirable suppression or elimination of the secondary pulse. The present invention relates to an apparatus specifically designed to implement this technology. However, the present invention is also adapted for applications where no bubble suppression is desired.

As taught in the aforereferenced materials directed toward bubble suppression, the undesired secondary signal or pulse produced by maturation of the bubble resultant from the generation of the primary pulse may be substantially reduced or even eliminated by injecting within this bubble a second charge of pressurized gas, and timing the initiation and duration of said injection so as to substantially establish hydrostatic pressure within said region at the instant the volume of said region reaches its maximum value.

An adequate and optimum implementation of such a method generally requires the presence of the following two conditions:

(a) the release of the second charge of pressurized gas must be delayed from the release of the first charge that results in the generation of the primary pressure pulse; and (b) the duration of the second release of pressurized gas—or injection—must be precisely timed. When a minimum injected energy is utilized (a generally preferred condition) this duration is comparatively brief: less than 0.2 T, where T is the period of the bubble generated by the first charge.

Compliance with the aforementioned conditions of bubble suppression necessarily restricts the design of a workable apparatus. In order to exploit such conditions, however, such an apparatus necessarily includes a generator for emitting the primary gas pulse and an injector or suppressor for emitting the second gas injection.

When a highly pressurized charge contained by the generator reservoir chamber is explosively released in the water to generate a powerful primary pulse, the water immediately surrounding the generator experiences a rapid, large pressure increase. When bubble suppression is desired, a secondary injection of gas must be made inside the cavity formed by this initiqal release. In accordance with the preferred methods as aforedescribed, such injection must also be made directly into this cavity. In order to satisfy this requirement of "direct injection", therefore, the injector reservoir chamber must necessarily be situated closely proximate the generator. As so situated, the injector also experiences this large pressure increase created by the generator.

In order to function effectively, however, the injector, which like the generator contains a charge of pressurized gas, must remain completely sealed until activated. This seal is normally effected via an injector valve. Failure of this injector valve to completely contain the pressurized charge can detrimentally affect the timing of the injection. Therefore, in order to establish optimum bubble suppression, the injector valve element must remain substantially unresponsive to outside pressures and especially "overpressure" such as the pressures emanating from the generator. These overpressures can be substantial inasmuch as the pressurized charge in a generator may be greater than 2000 PSI.

To take advantage of the pressures generated by the generator upon release of its pressurized charge, e.g., greater than 2000 PSI, the valve element of the injector should be such so as to apply this "overpressure" to tighten the valve seal upon the introduction of said rapid outside pressure increase. Thus, the valve element of the injector must generally be comprised of a sealing element held in place to the exterior of the chamber. Further, to conserve space, the means to hold such valve in place, to move said valve and return said valve to its original position should be physically located in the reservoir chamber itself. Thus positioned, objectives of both secure containment and space economy may be accomplished.

In reference to the second condition of ideal bubble suppression as above described, it has been found that in order to optimize the implementation of state of the art techniques for bubble suppression, e.g., (a) to utilize the minimum value of the injected energy; and (b) to establish a bubble-to-primary ratio about 5% or less, the injection of the second charge (or suppressor charge) must be directly injected into the bubble created by the generator. The term "directly" as used herein means that the second gas charge used to establish the hydrostatic pressure inside the bubble is neither released into the water and deflected toward the inside of he bubble, nor transferred, even to a small extent, into an intermediate chamber before being released within the bubble.

The above discussion of direct injection presupposes, among other things, that the bubble generated by the release of the first charge completely encompasses the gas outlets or main ports of the second chamber or suppressor. For a given spacing between the main ports of the generator and the main ports of the suppressor, the bubble generated by the first charge (generator) may or may not encompass the main ports of the suppressor. When using such prior art sources, it follows that they may not be usable to achieve uniform or efficient bubble suppression at all firing depths. It is therefore an important aspect of the invention that the main ports of the suppressor be established in as close a relationship as possible with the main ports of the generator so that the bubble created by the generator will completely encompass the suppressor's ports for a wide range of firing depths.

In this respect it is important that the main ports of the generator and the injector are preferably located at an end of said generator and injector. In such a fashion, the main ports will be positioned end-to-end when assembled.

Additionally, the opening of the main ports are advantageously triggered independently of eahc other so that the instant the injection starts could be optimally adjusted or tuned should the firing conditions (i.e. the air pressure or the firing depth, etc.) change. Such an independent triggering system will also allow the operator to use only one of the two reservoir chambers. As an example, two solenoid valves could be used, each triggering one shuttle valve.

Further the above solenoid valves for instance and the electrical firing lines used to energize those valves, as well as the flexible pipes through which the pressurized gas is supplied to the gun are preferably connected to the gun at the same end, therefore minimizing the bending stresses and wear that these lines sustain when the gun is towed underwater.

B. Description of the Preferred Embodiment

In a preferred embodiment of the invention as illustrated in FIG. 1, a cylindrical housing 4 defines in its interior two reservoir chambers 6 and 6' longitudinally disposed about a partition or barrier 10. In FIG. 1, reservoir chamber 6 accommodates the generator and reservoir chamber 6' accommodates the suppressor or injector. As such, chamber 6 is normally smaller than chamber 6', although it is envisioned that these relative relationships may vary dependent on operational parameters.

Reservoir chambers 6 and 6' communicate with the marine environment 2 via two or more sets of main ports 99 and 99' and auxiliary which are ports or vents 12 and 12' disposed in the walls of the housing 4. Preferably, two or more such ports or vents are provided per chamber, said ports being equilaterally situated about the periphery of the housing 4 so as to offset the recoil of the device when the primary or secondary gas charges are released as will be further discussed herein. Main Ports 99 and 99' of both chambers 6 and 6' are preferably situated in close proximity to each other. In such a fashion, internal injection may be accomplished at a variety of pressures and depths in accordance with state of the art methods and principles of bubble suppression.

Figure 2:
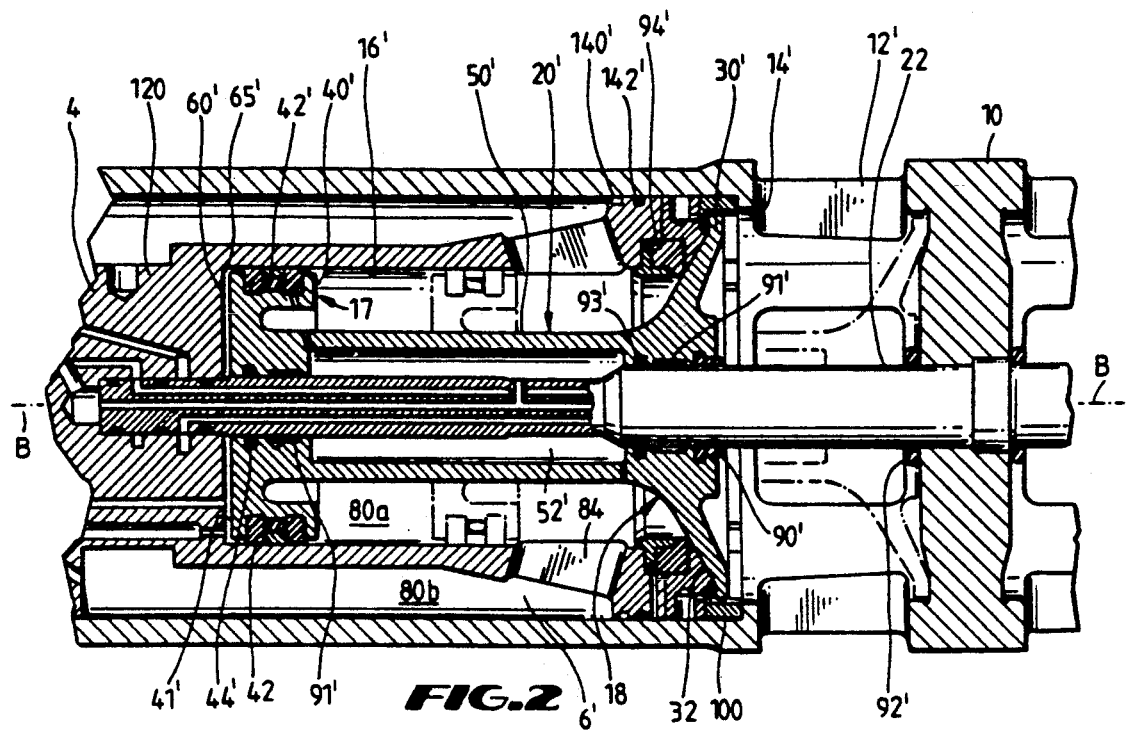
FIG. 2 illustrates a detailed, cross sectional view of the injector shown in FIG. 1 as taken along major axis B—B.

Housing 4 preferably defines first bores 14 and 14' immediately proximate partition 10, and second bores 16 and 16', communicating with first bores 14 and 14', and located within reservoir chambers 6 and 6' respectively. The second bores extend out toward the terminus of the housing 4 as shown in FIGS. 1 and 2. Referring to FIG. 1, partially disposed in each of chambers 6 and 6' are shuttles 20 and 20'. Shuttles 20 and 20' are slidably coupled to guide shaft 22 which is longitudinally disposed through housing 4 about main axis B. As illustrated, shaft 22 is connectedly disposed through partition 10 so as to establish fluid communication between reservoir chambers 6 and 6' as will be further described.

As illustrated in FIG. 1, injector reservoir chamber 6' is preferably larger than generator reservoir chamber 6. However, in both the generator and the injector, it is preferred that shuttles 20 and 20' are of identical dimensions. Each shuttle is slidably and sealingly mounted head to head on opposite ends of shaft 22 where it may undergo a piston-like movement in a longitudinal direction coaxial to the major axis B of the housing 4 upon the release of a gas charge. The longitudinal movement of shuttles 20 and 20' is illustrated in FIGS. 10A-G.

Referring to the injector illustrated in FIG. 2, shuttle 20' is preferably comprised of a large piston or valve 30' and a smaller piston 40'. The larger piston 30' is adapted to reciprocate in large bore 14' outside reservoir chamber 6', while smaller piston 40' reciprocates in smaller bore 16'. The large and the small piston are coupled in spaced relation by a hollow connecting member or shaft 50'. Connecting shaft 50', in combination with guide shaft 22, forms an annular bore or return chamber therebetween. This return chamber is referenced by 52' in injector chamber 6' and by 52 in generator chamber 6. An exploded view of the integral shuttle, including large piston, smaller piston and connecting shaft, may be seen by reference to FIG. 7. As illustrated, shuttles 20 and 20' are preferably comprised of one piece so as to achieve maximum structural integrity.

Referring again to FIG. 2 and FIGS. 10A-G, shuttles 20 or 20' may assume either a "cocked" or "uncocked" position with their respective chambers 6 and 6'. Referring to injector reservoir chamber 6', in a first or "cocked" position, smaller piston 40' is retracted about shaft 22 so as to substantially fill smaller bore 16' and establish contact with the distal end or bottom wall 60' of reservoir chamber 6'. The interproximal area between the containment side 41' of the smaller piston 40' and the distal end 60' of the smaller bore 16' defines an injector triggering chamber 65', the operation of which will be further discussed herein.

Smaller piston 40' is both slidably and sealingly disposed in said smaller bore 16' by seal 42', and slidably and sealingly disposed about shaft 22, by seal 44'. A detailed view of seal 42' (and identical seal 42) may be seen by reference to FIG. 6. In operation, shuttles 20 and 20' reciprocate through reservoir chambers 6 and 6' many times per minute, thus placing a heavy sealing load on all sealing components. Since shuttle 20', and hence piston 40', operate in the presence of water—usually salt water—seal lubricants may generally not be used to help maintain the position of the various seals on their associated components. Due to the lack of such lubricants as well as the sealing loads associated with the operation of the air gun, conventional O-ring seals have been found impractical. Seal 42' represents a sealing system designed to provide adequate sealing under such rigorous conditions.

Seal 42' generally consists of an O-ring 47' and a cap seal 48', the combination designed to fit between bearing rings 46' in a specially designed slot formed in the outer diameter of piston 40'. This high pressure sealing system is the subject of U.S. Pat. Application Ser. No. 300,610 which is herein incorporated by reference.

Figure 4:
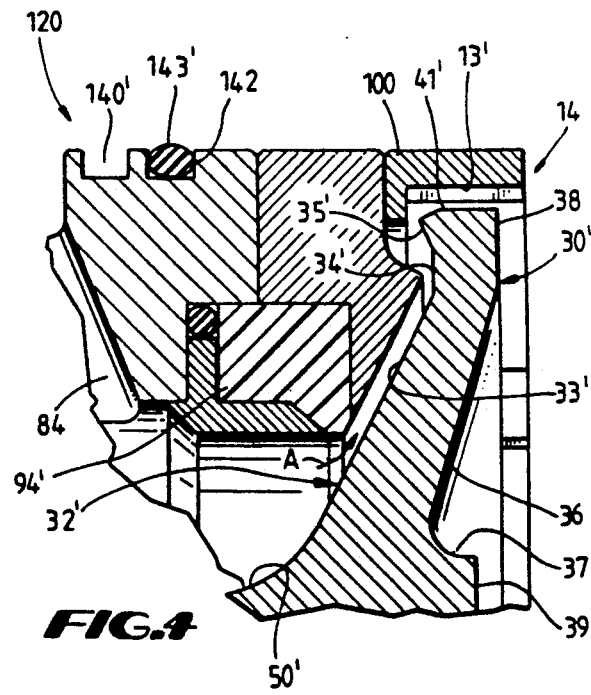
FIG. 4 illustrates a detailed, cross sectional view of the larger piston of the shuttle as it may be fitted inside the larger chamber.

Referring to FIGS. 2 and 4, the containment side 32' of larger piston 30' in a "cocked" or seated position is drawn against containment seal 94' to form a reservoir chamber. Referring to injector reservoir chamber 6' as illustrated in FIG. 2, reservoir chamber 6' is generally comprised of an inner firing subchamber 80A and an outer firing subchamber 80B. Subchambers 80A and 80B communicate through internal portal 84, thereby allowing pressure equalization therebetween.

Referring to FIG. 2, larger piston or valve 30' is slidably and sealingly disposed about guide shaft 22 such as to maintain pressure containment in return chamber 52' when shuttle 20' reciprocates along shaft 22 between a "cocked" and "uncocked" position. As illustrated in FIGS. 2 and 4, larger piston 30' is slidably, but preferably not sealingly, disposed at its outer periphery in the chamber 14'. This lack of contacting seal arrangement between piston 30' and bore 14' enables shuttle 20' to travel at a greater velocity toward partition 10 upon actuation. A partial sealing effect is nevertheless created by the close tolerance, metal-to-metal fit of the periphery of the larger piston 30' in the larger bore 14' as will be further described, thus forming a pressurizeable firing chamber 80.

It is envisioned that the housing 4 may be comprised of a number of individual components which may be removable coupled together to aid in inspection and repair. Referring to FIGS. 1 and 7, in a preferred embodiment housing 4 comprises a hollow cylinder including a plurality of ports 12 and 12' arranged closely proximate partition 10 and roughly disposed about its intermediate or middle portion. Referring to FIG. 1, one end of the housing a towing end 240. In a preferred embodiment, the portion of housing 4 including standing end 230 generally includes injector reservoir chamber 6', while the towing end 240 includes the generator reservoir chamber 6, as shown.

In injector, reservoir chamber 6', the formation of smaller bore 16' is preferably achieved by the insertion of a cylindrical sleeve 120'. See FIGS. 2 and 7. Referring to injector reservoir chamber 6' as illustrated in FIG. 2, sleeve 120', in combination with the inner diametrical extent of the chamber 6', forms firing subchamber 80B. Firing chamber 80B in turn communicates with chamber 80A through portal 84 as earlier described.

Figure 3:
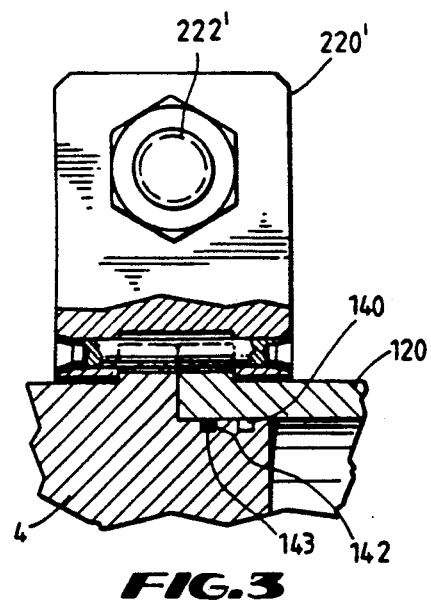
FIG. 3 illustrates a detailed, cross sectional view of the sleeve as it may be secured to the body.

Referring to FIGS. 1, 3 and 7, sleeve 120' is preferably coupled to housing 4 via a C-clamp assembly 220' secured by fasteners 222'. Fastening brackets 224' (FIG. 7) may be included in clamp assembly 220' to provide a secondary means of packing, lifting or towing.

To prevent gas or fluid flow between sleeve 120' and housing 4 during operation, both ends of sleeve 120' are provided with specialized sealing surfaces. Referring to FIGS. 2-4 and 7, sealing surfaces 122' preferably comprise two radial grooves 140' and 142' formed along the outer diameter of sleeve 120' and disposed in close arrangement as illustrated. Outer groove 142' is provided with an O-ring 143 or other suitable high pressure seal to induce a gas tight fit between sleeve 120' and housing 4. As illustrated, inner groove 140' is immediately proximate high pressure gas flow from chamber 30B, but is preferably not fitted with a sealing element. This type of sealing arrangement is desirable to reduce the velocity of gas or the change in fluid pressure acting on seal 143'. Pressurization and depressurization of seal 143' is dampened by groove 140'. Hence, the rate at which gas or fluid pressure changes on outer seal 143' is minimized, thus resulting in a better sealing environment.

In both shuttles 20 and 20', larger piston or valve member 30 is deigned to accomplish a number of objectives necessary to establish a maximum primary acoustical impulse while optimizing principles of bubble suppression. Referring to FIG. 4, the containment side 32' of larger piston 30' is formed so as to maximize the propulsion effect of the pressurized gas contained in reservoir chamber 6' such as to rapidly move the larger piston 30', and hence shuttle 20', from a "cocked" to an "uncocked" position, hence releasing a pressurized gas charge directly into the water. The containment surface 32' of larger piston 30' comprises an inclined inner surface 33' proximate sleeve 50', a parallel surface 34' relative to partition 10, and an outer reverse inclined surface or lip 35'. The cup-like containment surface 32' resultant from these three surfaces maximizes the propulsive effect of the pressurized gas on surface 32'. Hence, maximum shuttle velocity is accomplished upon actuation. Additionally, the curved surface 32' of lip 35' effectively disperses gas flow acting thereof resulting in a partial "jet reversal". This dispersion of gas flow greatly reduces the recoil of the apparatus upon activation.

The frontal portion 36' of piston 30' is configured so as to minimize its impact on partition 10. In such a fashion the overall wear life of both components may be greatly extended. Referring to FIG. 4, larger piston 30' defines at its frontal extent a recessed portion 37' disposed between outer shock ring 38' and piston tip 39'. Ring 38' and tip 39' define leading surfaces generally parallel to partition 10. The recessed design of frontal portion 36' enables the accumulation of a water slug or pocket as piston 30' moves longitudinally along shaft 22 into contact with partition 10. This water slug or pocket acts as a hydraulic shock absorber or dampener as the larger piston 30' engages and impacts partitition 10.

It should be noted that before the shock absorbing or dampening effect created by surface 36' appreciably effects the longitudinal velocity of shuttle 20' upon actuation, gas pressurized in reservoir chamber 6' (or 6 when speaking of the generator reservoir chamber) has already been substantially released. In such a fashion, desirable acoustical performance and bubble suppression is not sacrificed in order to attain equipment longevity.

To maintain the alignment of shuttles 20 and 20' along shaft 22 during reciprocation, shuttles 20 and 20' are provided with bearings 91' (FIG. 2 and 9). These bearings are preferably comprised of a non-compressible material having a low friction coefficient.

As illustrated, bearings 91' are situated adjacent sealing element 93'. To protect bearings 91' from the abrasive or corrosive effects of muddy or sandy water, a "wiper" ring 90' is preferably provided on the leading edge of larger piston 30'. In operation, ring 90' wipes free all particles that could be squeezed between the shuttle and shaft 22.

To avoid damage to the contact surfaces, especially shaft ring 38' and tip 39' of frontal portion 36', upon accidental discharge of its device out of the marine environment, e.g. when the device discharges while on board the seismic vessel, an O-ring assembly 92' may be placed ont the contact area of shaft 22 adjacent partition 10 as shown FIG. 2.

It is desirable that larger piston 30 attached to both reservoir chambers 6 and 6' be capable of producing a series of repeatable, closely space discharge of producing a series of repeatable, closely spaced discharges of pressurized gas. To minimize teh time lag between each discharge, means must therefore be present to quickly recock shuttle 20. To accomplish such recocking, pressurized gas or fluid remaining in reservoir chamber 6' or 3 must be vented past larger piston 30 upon retraction or recocking of shuttle 20. Referring to FIG. 4, this objective is accomplished by the design of the outer diametrical extent or periphery 41' of the larger piston 30' in relationship to the inner sealing surface 13' of bore 14'. As previously noted, piston 30' preferably does not sealingly engage the inner diameter 13' of the bore 14'. Instead, a close tolerance metal-to-metal fit is achieved between these two components. Such a design allows nominal gas and fluid escape past the larger piston during the pressurization process as shown by arrow A in FIG. 4. Such escape, however, is not significant from the aspect of diminishing the nature of the pressurized charge is reservoir chambers 6' and 6, since such escape is substantially less than the rate of the pressurized gas feed into such reservoir chambers as will be further discussed. Such a metal-to-metal seal does, however, allow for a favorable and often sufficient venting of gas and fluid past the sealing surface formed between piston 30' and bore 14' (and 14 when speaking in terms of the generator) upon recocking, so that during the cocking procedure no additional gas or fluid pressure is added to the reservoir chambers.

In some applications, it is contemplated that such nominal gas or fluid escape might overly slow the retraction of shuttle 20' so as to impede a desirous actuation rate for reservoir chamber 6'. To accelerate the actuation of shuttle 20' to a cocked position in such circumstances, larger bore 14' may be provided with a removable to FIG. 5, vent ring 100 is generally L-shaped in design, the lip or heel portion 102 of the ring 100 forming a seat for lip 35' of piston 30'. The side wall 104 of the ring 100 is provided with a series of shallow longitudinal grooves 106 regularly spaced about its inner diameter. These grooves 106 regularly spaced about its inner diameter. These grooves 106 contact the lip 102 and empty into auxiliary ports or vents 12' as shown in FIG. 2.

The utilization of ring 100 in combination with larger piston 30 still allows for the maintenance of a desired fluid or gas pressure in reservoir chamber 6 as aforedescribed. However, grooves 106 in vent ring 100 more readily allow shuttle 20' to be retracted to a cocked position by allowing pressurized gas or fluid remaining in reservoir chamber 6' to be more quickly discharged past piston 30' into fitting bay 13'.

As designed, ring 100 is a wear part designed to accommodate the repeated hydraulic friction of repeated operation. As such, it is envisioned that ring 100 will necessitate removal after a period of operation. Aside from other functions as aforedescribed, lip 102 accommodates this removal without the need for special tooling. To decrease the need for frequent replacement, ring 100 is preferably formed out of marine bronze or beryllium.

Operation of the present apparatus is accomplished via the management and release of pressurized gas or fluid into and from various sealed components or chambers formed throughout the housing 4. This gas management is accomplished to a large extent by passing gas through shaft 22 which acts not only as a guide for shuttles 20 and 20' but also as a gas conduit. Referring to FIGS. 1, 8 and 9, shaft 22 is longitudinally disposed through partition 10 about axis B—B. As illustrated, shaft 22 preferably defines two continuos, integrated segments about its length. At its terminal ends, shaft 22 defines segments of smaller diameter 24 and 24', said segments integrated with the larger diameter segment 26 disposed about its intermediate portion. Larger diameter segment 26 generally is disposed in larger bores 14 and 14' as illustrated in FIG. 1. As also illustrated, smaller diameter segment 24 is generally disposed in smaller bores 16 and 16'. To establish strength and continuity of fluid flow therethrough, shaft 22 is preferably formed in one piece.

The differential shape of shaft 22 as above described is important to the reciprocation or recocking of shuttles 20 and 20' after actuation. Referring to FIGS. 8 and 9, larger piston 30 and smaller piston 40 are coupled together in spaced relation via connecting shaft 50. Connection shaft 50 and guide shaft 22 together define injector return chamber 52' and generator return chamber 52. As may best be seen by reference to FIG. 10, the configuration and size of chamber 52 is variable depending on the longitudinal position of shuttle 20 about shaft 22. When shuttle 20 is situated in a "cocked" position, shaft 50 is substantially situated about the smaller diameter portions 24 of shaft 22 and therefore defines a return chamber 52 of maximum volume. When shuttle 20 is actuated toward partition 10, shuttle 20 moves inwardly along the larger diameter portion of shaft 22, thus restricting the overall volume of the return chambers and creating a situation of higher pressure therein.

The variable geometry of return chambers 52 and 52' serves as a form of gradual dampening force to the movement of shuttles 20 and 20' toward partition 10. Such dampening force combines with the dampening effect created by the frontal portion 36 of piston 30 and 30' as above described to minimize component wear. This dampening force, however, is maximized only when shuttle 20 and 20° have substantially achieved a full stroke and released pressurized gas through main ports 99 and 99'.

Most importantly, return chambers 52 and 52' serve to return shuttles 20 and 20' to their "cocked" position after actuation. In reference to generator reservoir chamber 6, when shuttle 20 is situated in its "cocked" or seated position, gas pressure inside chamber 52 is substantially equal to that present in reservoir chamber 6 as will be further described herein. When actuated, shuttle 20 moves quickly toward partition 10, discharging high pressure gas through main port 99 and into water 2 through ports 12. When evacuated, reservoir chamber 6 contains substantially lower pressure than return chamber 52 which has now been further pressurized by a constriction in volume. Due to the different of diameter in shaft sections 24 and 26, shuttle 20 is urged longitudinally inward toward reservoir chamber 6 along shaft 22, hence assuming a recocked position.

The exact speed of the recocking process as above described is dependent on the diameter difference between shaft sections 24 and 26 and on the escape of fluid and gas past the outer diameter 39 of lower piston 30 as previously described. In the ordinary case, however, such recocking is accomplished within the order of 0.6 sec.

As noted, shaft 22 serves as a conduit for pressurized gas flow through sealed compartments in both chambers 52 and 52' and from there into reservoir chambers 6 and 6'. Shaft 22 may be seen in its entirety in FIG. 1, and in detail in FIGS. 8-9. As may be seen by reference to these figures, shaft 22 includes gas passages 300, 310 and 320, each longitudinally extending substantially through its entirety. Referring to FIGS. 7 and 8-9, and beginning with the standing end 230 of housing 4, intermediate passage 310 communicates with pressurization passage 340 via bore 341. This passage 340 through injection bore 350 is coupled to air pressure line 344 via coupling 343. Air pressure line 344 in turn in coupled to compressors (not shown) on board the seismic vessel. Pressurized gas, usually air, pumped through coupling 343 into passage 310 serves to pressurize the entire system as will be further described. To aid in quick pressurization of the system, injection bore 350 also empties into firing subchamber 80B via passage 351.

Passage 310 extends for approximately three quarters of the length of shaft 22 until it terminates in generator return chamber 52 as illustrated in FIG. 9. Passage 310 also empties into injector return chamber 52' as shown. In such a fashion, gas pressure is first established in injectors return chamber 52' and then generator return chamber 52, the two chambers being maintained at equal pressure. Such pressurization of chambers 52 and 52' results in a recocking of both shuttles 20 and 20'.

The present apparatus may be pressurized after being placed in the marine environment. This is possible since the air gun is able to effectively purge itself of any fluid upon pressurization. Referring to FIGS. 8-9, return chambers 52' and 52 are provided with a series of minute outlets 98' and 98 emptying into reservoir chambers 6' and 6, respectively. These outlets 98 and 98' are disposed in sleeves 50 and 50', preferably at 120° increments along its outer radii. Due to the positioning of these outlets, any fluid migrating into return chambers 52 and 52' will be removed via outlets 98 and 98' regardless of the orientation of the device in the water when the return chambers are pressurized.

Through outlet 98 and 98', pressurization of return chambers 52 and 52' results in the pressurization of reservoir chambers 6' and 6. Hence, return and reservoir chambers are sequentially pressurized by the injection of gas through passage 310. Any water remaining in reservoir chambers 6' or 6 is vented after a few cycles of operation.

Referring to FIGS. 8-9, passage 300 of shaft 22 is coupled to first a generator solenoid 400 at the standing end 230 of the device via connecting passage 405. At the towing end 240 of the unit, passage 300 empties into collection bore 415, said bore in turn communicating with generator reservoir chamber 6. Hence gas pressure maintained in chamber 6 through return chamber 52 is communicated to solenoid 400.

Passage 320 also communicates with generator solenoid 400 at the standing end 230 of the unit via a separate passage 410. Passage 320 extends through shaft 22 emptying into trigger chamber 65 in generator chamber 6. Trigger chamber 65 in turn communicates with marine environment 2 via passage 500. Passage 320 connects solenoid 400 with generator trigger chamber 65. As such, pressurized gas released through solenoid 400 travels through shaft 22 into trigger chamber 65 so as to actuate the movement of shuttle 20 and hence the generation of the first acoustical pulse as will be further discussed herein.

Injector solenoid 440 communicates with injector subchamber 80B through portal 420 as shown in FIG. 1. Solenoid 440 in turn communicates with injector trigger chamber 65' through passage 430. Thus situated, gas pressure in subchamber 80B may be transferred via solenoid 410 to trigger chamber 65', thus inducing activation of the injector shuttle 20'.

A simplified description of the operation of the present injector may be described as follows by reference to FIGS. .1, and 8-9. After the device is placed in the marine environment 2 via a tow line or the like, the gun is armed by the injection of pressurized gas, air, etc., through coupling 343. Pressurized gas enters passage 310 via connecting passage 340, whereupon pressure is nearly simultaneously established in return chambers 52 and 52' of the generator and the injector, respectively. Therefore, recocking both shuttles 20 and 20' allows pressurization of chambers 6 and 6q40 . Pressurized gas in chambers 52 and 52' vents to reservoir chambers 6 and 6', through small apertures 98' and 98. Any fluid in chambers 52' and 52 is likewise vented to chambers 6' and 6, through apertures 98' and 98. Gas pressure is now established in both the return and reservoir chambers of the generator and the injector. Due to the larger size of injector reservoir chamber 6', pressure in this chamber is simultaneously established through direct connection to air pressure line 344 via inlet 351. When pressure has been established in both the reservoir and return chambers of both units, pressurized gas is forced through contact inlet 417 and passage 420 through passage 300 to solenoid 400. Simultaneously, gas from subchamber 80B pressurizes solenoid 440 through passage 420'.

Upon complete pressurization of the system as above described, shuttles 20 and 20' are held in a cocked position in their respective chambers. This is due to a number of factors. As previously described, gas pressure in both return chambers 52 and 52' enjoys a lower pressure state when shuttles 20 and 20' are situated in a cocked position. Due to this pressure exerted by return chambers 52 and 52', pistons 30 and 30' assume a position fairly snug against sealing ring 94 and 94'. Additionally, and referring by example to FIG. 2, gas pressure in reservoir chamber 6' is directed against both the contact surface 17 of the smaller piston 40' and the contact surface 18 of the larger piston 30'. The contact surface 18 of larger piston 30' when held against sealing ring 94' is slightly smaller than the contact surface of smaller piston 40'. Since the pressure throughout chamber 6' is constant, the same pressure applied against a larger surface area, in this case the contact surface 17 of smaller piston 40', overcomes the pressure applied against surface 18 of piston 30', thus urging shuttle 20' to seal against ring 94'. In such a fashion, the larger piston 30' is held to the exterior of the reservoir chamber by an interior sealing means, and thus will remain unresponsive to outside overpressure.

Upon unit actuation, an electrical signal from a timing system on board the seismic vessel activates solenoid 400, causing solenoid 400 to release high pressure gas through passage 320 into generator trigger chamber 65. This injection of high pressure gas in trigger chamber 65 overcomes the sealing effect of the gas pressurized in the reservoir chamber 6 acting on sealing surface 17, thus causing shuttle 20 to move downwardly toward partition 10. When larger piston 30 disengages sealing ring 94, gas pressure in reservoir chamber 6 now contacts the full contact surface area 18 of this piston 30. Thus, shuttle 20 which has begun a rapid movement toward partition 10 upon pressurization of trigger chamber 65, now greatly accelerates. When shuttle 20 clears main port 99, the gas charge in reservoir chamber 6 is directly released into the water through auxiliary ports 12, resulting in an acoustical pulse. After a set period as determined by the methodology set forth in U.S. Pat. No. 4,735,281 and U.S. Pat. No. 4,921,068 solenoid 440 next actuates, repeating the entire procedure, except this time injecting a pressurized gas charge into the bubble created by the first discharge.

The operation of the present device may be more specifically described by reference to the following section.

C. Detailed Description of Operation

The following description is made by reference to FIGS. 1, 8-9, and by specific reference to FIGS. 10A-G, and is representative of one firing cycle using an apparatus of specific dimensions and capacities. The following description is merely illustrative of the invention, and should not be interpreted as imposing any limitations on its structure or functions.

The following sequence is initiated in a device the preferred embodiment of which has been previously described and illustrated. This device has been connected to an air pressure source on board a seismic vessel or the like. The operation of the device is preferably controlled by an on board timing system. The device is considered to include a 45 in$^3$ generator reservoir chamber, a 105 in$^3$ suppressor or injector reservoir chamber, and air pressurized to about 2000 PSI.

Phase 1: (See FIG. 10A)

The gun is cocked. Shuttles 20 and 20' are forced against sealings rings 94 and 94' and thus are sealing the 45 in$^3$ generator reservoir chamber 6 and the 105 in$^3$ injector reservoir chamber 6'. Both generator and injector return chambers (52 and 52', respectively) are under the same pressure as the reservoir chambers 6 and 6' at 2000 PSI. Both generator and injector triggering chamber (65 and 65', respectively) are in communication with the hydrostatic pressure through nozzles 500 and 502.

Phase 2: (See FIG. 10B)

An electrical pulse is sent to the generator solenoid valve 400. A small amount of pressurized gas is transferred from generator reservoir chamber 6 into generator triggering chamber 65 through solenoid valve 400 and then passage 320. When the pressure in trigger chamber 65 reaches a selected pressure of about 260 PSI, the force keeping shuttle 20 against the sealing ring or seat 94 is unbalanced and therefore shuttle 20 starts moving outwardly toward partition 10.

As soon as the seal is broken between the shuttle 20 and the sealing ring 94, gas pressure is applied on the entire section of the shuttle, which is accelerated during the acceleration stroke until it discharges pressurized gas from chamber 6 through main ports 99 into the water.

When the high pressurized gas contained in reservoir chamber 6 is suddenly released in the water, a strong acoustic pulse is emitted. Simultaneously, a bubble is created which begins a rapid expansion.

Phase 3: (See FIG. 10C)

At the end of the stroke, shuttle 20 is gently stopped by laminating the water located between the large piston 30 and partition 10. This is caused by the collection of a water slug in recessed portion 37 of the frontal area 36 of larger piston 30.

The gas once contained in the generator reservoir chamber 6 becomes depressurized into the bubble. The bubble will, without other action on it, oscillate and generate an undesirable pulsating signal. In order to suppress or eliminate the generation of this pulsating signal, the second part of the apparatus, the "INJECTOR", must be fired as described in phase 4.

The gas injected in the generator trigger chamber 65 is vented out in the water 2 through vent hole 500. When solenoid 400 is closed, further venting may still take place through vent hole 500.

Because of the head losses in shaft 22, the time needed to vent generator trigger chamber 65 is around 500 mSec.

Phase 4: (See FIG. 10D)

A few milliseconds before the generator bubble reaches its maximum radius (the pressure then inside the bubble is close to zero), the second or injector solenoid 440 is energized. The timing of this energization is strictly controlled in accordance with state of the art techniques as will be further described herein.

Upon activation of solenoid 440, a small amount of pressurized gas is transferred from the injector reservoir chamber 6' into the injector trigger chamber 65'. When the pressure reaches about 260 PSI, the force keeping the injector shuttle 20' against its seat or sealing ring 94' is unbalanced, therefore propelling shuttle 20' toward partition 10.

As soon as the seal is broken between the shuttle 20' and the sealing ring 94', gas pressure is applied on the whole section of the shuttle 20', which is accelerated until it clears main the injector ports 99'. The highly pressurized gas contained in the injector reservoir chamber 6' is then injected within a few milliseconds (through a large section) inside the generator bubble or cavity (not shown).

In accordance with the teachings of U.S. Pat. No. 4,735,281 and U.S. Pat. No. 4,921,069, the initiation of the injection, its duration, and the charge of gas in the injector have been selected to re-establish the hydrostatic pressure in the vacuum cavity and thus approach substantial elimination or suppression of the bubble pulsation created by the generator.

Phase 5: (See FIG. 10E)

At the end of the stroke, shuttle 20' is gently stopped by laminating the water located between the larger piston 30' and the partition 10. The gas injected in the injector trigger chamber 65' is vented into the water 2 through the vent hole 502.

When solenoid 440 closes, venting continues to take place through hole 502. The time needed to vent out the injector trigger chamber 65' is around 20 mSec.

Phase 6: (See FIG. 10F)

As soon as the recocking forces generated by high gas pressure in the return stroke chambers 52 and 52' overcome the forces due to the pressure in the reservoir chambers 6 and 6', and the trigger chambers 65 and 65', the shuttles 20 and 20' automatically recock to seal against the sealing rings 94 and 94' in accordance with principles earlier described.

Phase 7: (See FIG. 10G)

The generator and injector are repressurized in approximately 4 seconds. Generator reservoir chamber 6 is fed from the generator return chamber 52 through 3 nozzles 98 (not shown) located in the generator shuttle 20. The generator return chamber 52 is directly fed from the gas pressure line (not shown) through an aperture disposed in bore 310 in guide shaft 22.

Injector reservoir chamber 6' is fed from injector return chamber 52' through 3 nozzles 98' (not shown) located in shuttle 20' and the air line through nozzle 351. Similar to generator return chamber 52, injector return chamber 52' is fed via passage 310 in guide shaft 22.

The gun is typically cocked and pressurized at approximately 2000 PSI, though other pressures may be used. Under 2000 PSI, shuttles 20 seal against sealing rings 94 with an approximately force of 2300 lbs.

The Gun is Ready to Fire Again

Remarks:

Referring to FIGS. 8-9, nozzles 98"'s orientation in shuttle 20, in the reservoir chamber 6' and in the reservoir chamber 6 is such that all the chambers of the gun are operating free of water (leading to a very repeatable signature) even under severe conditions such as:
Overboarding without air pressure.
Operating under high humidity conditions.
Anti-freeze injection in compressed air.

D. Other Embodiments

As noted, that present device is specifically designed to function in accordance with state of the art techniques of bubble suppression. It may not always be desirable, however, to suppress or totally suppress secondary pulses resultant from the generation of the primary pulse. This is the case for example when the device to used for refraction work. Therefore, alternate embodiments of the invention are contemplated in which the generator and injector are not fired together or are fired simultaneously to achieve a more favorable acoustic signature.

For instance when such a device is fired at a depth of 6 meters and under 2,000 psi air pressure, the following output is obtained:

| Mode | PRIMARY (b-m/0-125 Hz) | BUBBLE PERIOD (MSEC) |
| --- | --- | --- |
| Generator Alone | 1.6 | 63 |
| Injector Alone | 2.4 | 84 |
| Generator and Injector Synchronized | 3.1 | 96 |

Therefore the device considered above can be regarded as a single conventional air gun that can be, without any modification except on the firing sequence, operated according to three different modes. Operation of such an apparatus in three different modes produces three different outputs and thus can be advantageously used to build conventional air gun arrays.

It is contemplated that the major components of the invention, i.e.—the housing 4, guide shaft 22, and shuttles 20 and 20' are formed from a single piece so as to enhance overall structural integrity. It is envisioned, however, that the housing 4 and guide shaft 22 might be removably coupled so as to allow for independent operation of the generator and the injector. Alternatively, it is envisioned that it may be desirable to construct the housing in multiple components so as to enable their ready interchangeability.

The power of the primary acoustic pulse is dictated in large part by the volume of gas released by the generator. When an exceptionally strong pulse is desired, it may therefore be necessary to increase the volume of the generator reservoir chamber.

In this regard the injector, with its larger reservoir chamber 6', can be used as a generator. In the above example the injector reservoir chamber 6' has a volume of 105 in$^3$ as compared to 45 in$^3$ for the generator reservoir chamber 6. Typically, when charged under 2000 psi air pressure the injector fired alone produces a primary pressure pulse of about 2.4 bar-meter in 0–125 Hz band, compared to 1.6 bar-meter produced by the generator alone. But when state-of-the-art techniques of bubble suppression are used, the generator should be used as an injector and according to the above referenced tuning conditions, the volume of reservoir chamber 6 should be increase from 45 in$^3$ to about 245 in$^3$.

Figure 11:
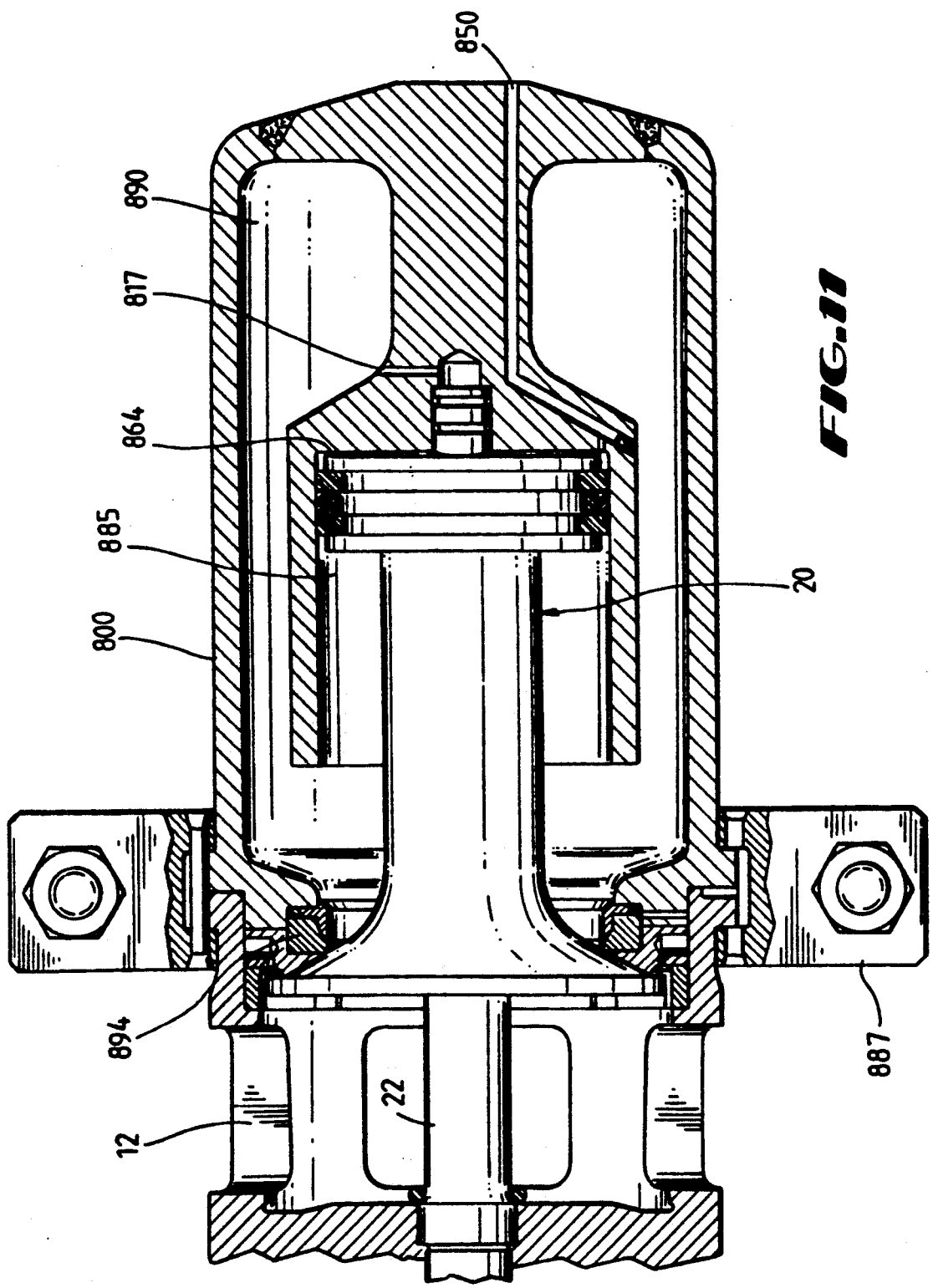
FIG. 11 illustrates a detailed cross sectional view of an alternate embodiment of the invention utilizing a modified generator firing chamber.

FIG. 11 illustrates an embodiment of the present device adapted to fill this need for interchangeability. In FIG. 11, the housing 4 is formed of at least two integratable segments adapted to be joined by a flange 887. As illustrated in FIG. 11, the generator housing 3, usually smaller in configuration than the injector chamber (not shown) has been replaced by a larger volume housing 880. In this configuration, housing 880 and accompanying reservoir chamber 885, does not function as a generator, but instead as the injector. In such a fashion, the larger gas charge contained in the injector (not shown) is used to produce a larger primary pulse and the reduction or elimination of secondary pulses is now accomplished by the even larger gas charge contained in firing chamber 885.

The adaptation of the injector (again not shown) to function as a generator involves no more than sending an electrical pulse to the injector (now generator) solenoid valve 440 in order to release the gas charge of chamber 6' to produce a larger primary pulse. Thus, after replacing housing 3 by housing 880, the timing sequence is reversed: solenoid 440 being energized first and then after a delay in accordance with state of the art techniques, solenoid 400 is activated. In this way it is possible through simple replacement of an inexpensive part, to use the same device to generate as essentially bubble-free pressure pulse having more than twice the original energy.

Modified housing 880 is structurally similar to generator housing 3 including gas pressurization valving or conduits 850 and 817. Likewise, shuttle 20 and associated sealing elements 854 are identical to the base apparatus as aforedescribed.

In some applications, it may be desirable to reduce the volume of gas released from the injector. This is the case when the air consumption should be minimized as in portable systems and/or when it is not necessary to achieve a total bubble suppression in a single unit as several devices are used in tuned arrays as seen in copending U.S. application Ser. No. 300,610, or when such a device is used as a conventional air gun to build a tuned air gun array of different volumes. In such cases, therefore, it may be desirable to have a ready means to alter or modify the volume of the injector reservoir chamber.

Figure 13:
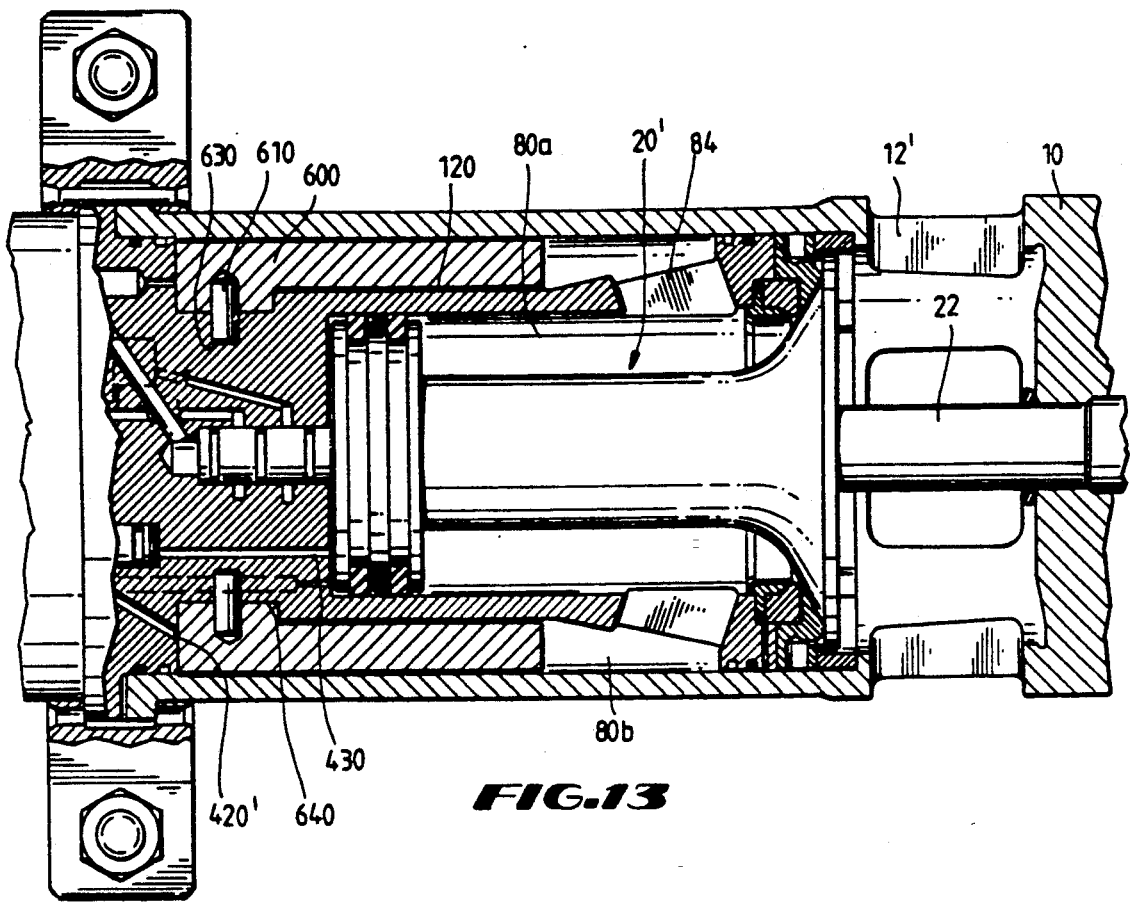
FIG. 13 illustrates a detailed, cross sectional view of the injector upon addition of the volume inserts.
Figure 12:
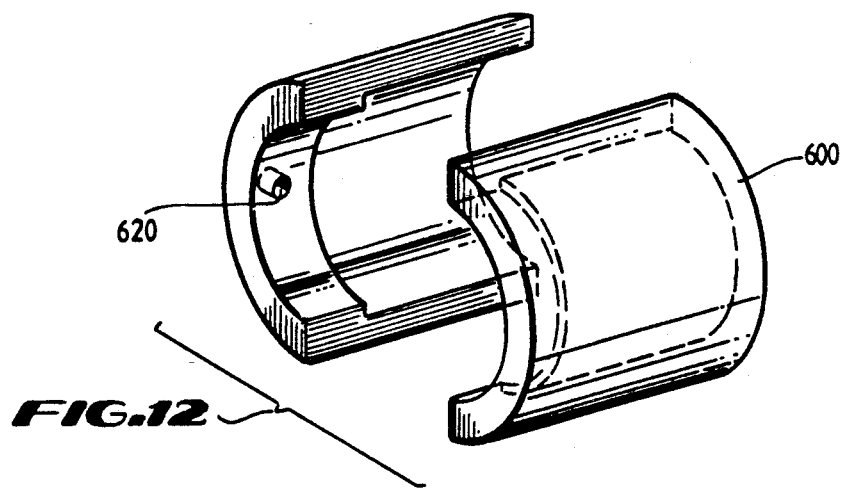
FIG. 12 illustrates a perspective view of volume inserts adapted to be fitted within the injector firing chamber.

As seen in FIG. 13., such a volumetric modification of the injector chamber may be accomplished via the addition of a spacer or plug 600. Plug 600 is designed to fit snugly in subchamber 80b via apertures 620, through which are inserted pins 610. Pins 610 are received in sleeve 120 via apertures 630. Structurally, plugs 600 are preferably formed in two halves or shells, said halves having an inner diameter closely matched to the outside diameter of sleeve 120 at the attachment site as above described. Half shells 600 are first placed around sleeve 120, so as to fit in groove 640 thus avoding any longitudinal displacement. Pins 610 are placed in hole 630 to avoid spinning of the half shells. Then sleeve 120 equipped with half shells 600 is mounted inside housing 4.

Plug or spacer 600 may be fabricated out of a variety of shock resistant materials, preferably those impervious to corrision e.g., a high grade plastic. Alternately, a metal may also be used, providing the aforedescribed criteria are satisfied.

Figure 15:
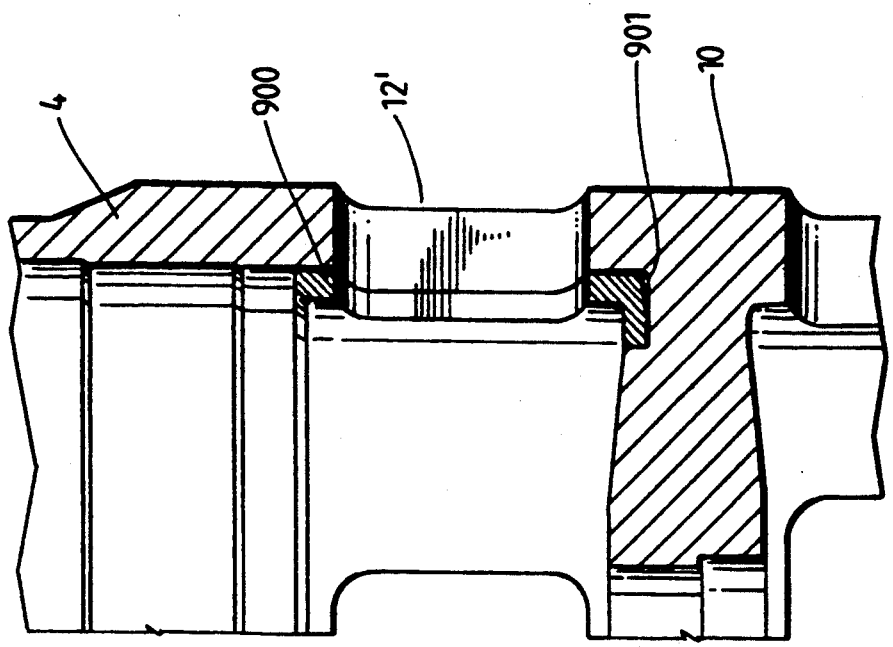
FIG. 15 illustrates a detailed cross sectional view of the housing including the sleeve insert.
Figure 14:
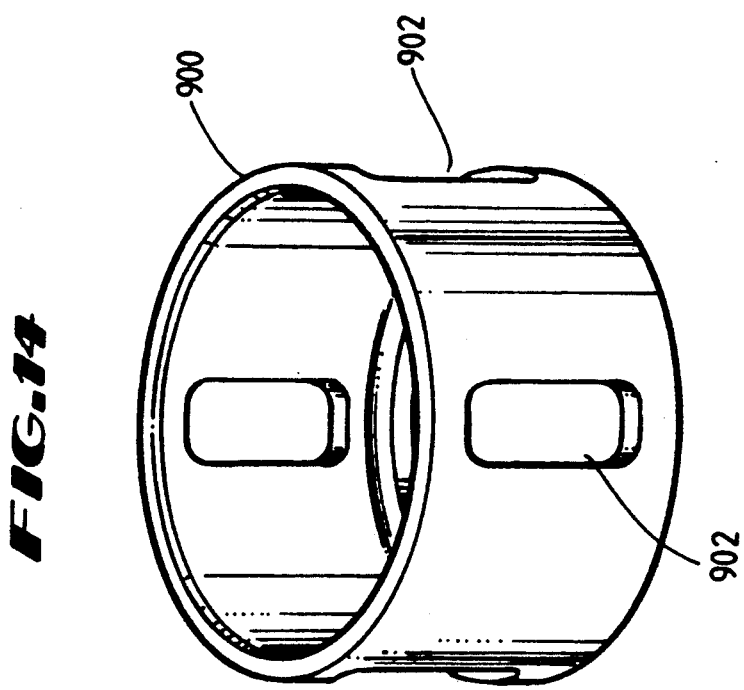
FIG. 14 illustrates a perspective view of a sleeve insert adapted to reduce the cross sectional area of the outlet parts.

In may also be desirable to reduce the cross sectional area through which the gas of the injector is injected into the bubble produced by the generator as described in U.S. Pat. No. 4,921,068. Such a reduction is achieved by inserting into housing 4 in front of auxiliary injector ports 12′ a cylindrical sleeve 900 as shown in FIG. 14. As seen in FIG. 14, the ports 902 of cylindrical sleeve 900 have a required cross sectional area smaller than the crossed section area of ports 12′. Sleeve 900 is maintained in groove 901 of housing 4 by ring 100 and sleeve 120 (FIG. 15).

What is claimed is:

1. A shuttle valve for a seismic gas gun adapted for movement between a first and second operative position, which comprises:
   a first cylinder having a first and second end portion and a longitudinal bore extending along a longitudinal axis thereof from adjacent said first end portion and through the second end portion;
   a second cylinder having a first and second end and a bore extending therethrough along a longitudinal axis, said second cylinder having a diameter less than the diameter of said first cylinder bore, defining a chamber therebetween;
   a piston having a diameter substantially similar to the diameter of said first cylinder bore and being positioned within said first cylinder bore adjacent said first end portion, said piston being coupled to the first end of the second cylinder;
   a valve member coupled to the second end of the second cylinder, said valve member having a valve seating surface adapted for operating in sealing relationship with the second end portion of said first cylinder when said shuttle valve is in said first operative position, said valve member having a longitudinal bore extending therethrough and in combination with said second cylinder bore defining an axial passageway therethrough; and
   a shaft positioned at least partially within said axial passageway and having a cross sectional area that increases along its length in a direction extending from the first end portion and toward the second end portion of the first cylinder, whereby movement of said piston, second cylinder, and valve member toward said second operative position raises the pressure of a fluid within said passageway to urge said piston, second cylinder, and valve member toward said first operative position.

2. The shuttle valve of claim 1 wherein the valve member has a diameter greater than the diameter of the valve setting surface.

3. The shuttle valve of claim 2 wherein the valve member includes a second surface facing away from the piston, and said second surface is at least partially recessed.

4. The shuttle valve of claim 3 which further comprises an end cap coupled to the second end portion of said first cylinder, and having at least one port extending therethrough through which fluid is free to pass from said chamber outside said first cylinder when said shuttle is in said second operative position, said end cap including a surface spaced from said second surface of said valve member for contacting said second surface in response to said shuttle valve moving to said second operative position.

5. The shuttle valve of claim 2 which further comprises said piston having a longitudinal bore extending therethrough and in combustion with said second cylinder bore and said valve member bore defining an axial passage therethrough, and said shaft extending entirely therethrough.

6. The shuttle valve of claim 5, wherein said shaft has a first end and second end portion, said shaft first end portion being coupled to said first cylinder first end portion and having a diameter less than said shaft second end portion.

7. The shuttle valve of claim 6, wherein said piston bore has a diameter substantially similar to the diameter of said shaft first end portion and said valve member bore has a diameter substantially similar to the diameter of said shaft second end portion.

8. The shuttle valve of claim 7, including a first seal positioned between said piston bore and said shaft first end portion and a second seal positioned between said valve member bore and said shaft second end portion.

9. The shuttle valve of claim 8, including means for injecting a pressurized fluid between said piston and said first end portion of said first cylinder to urge said piston, second cylinder, and valve member from said first operative position toward said second operative position.

* * * * *